Patented Feb. 19, 1924.

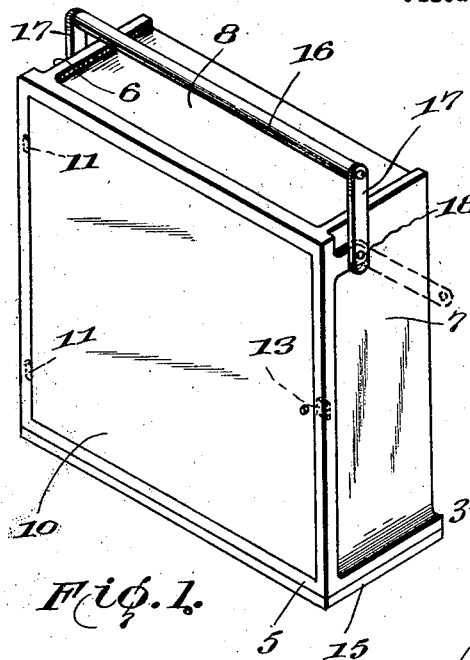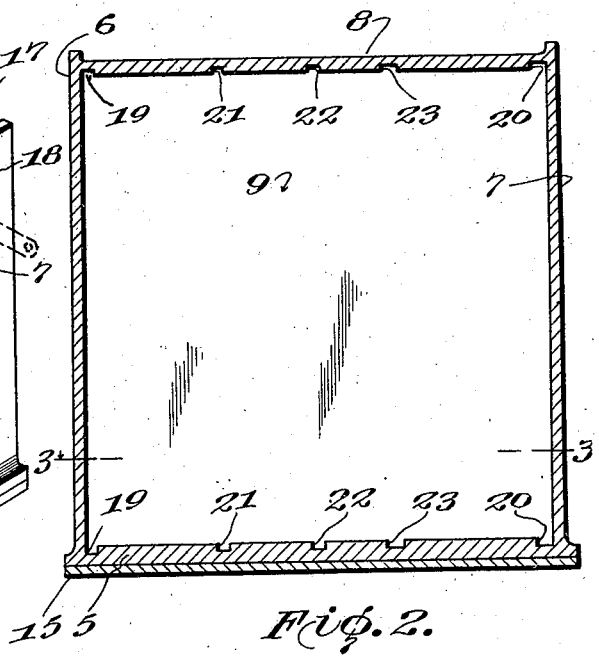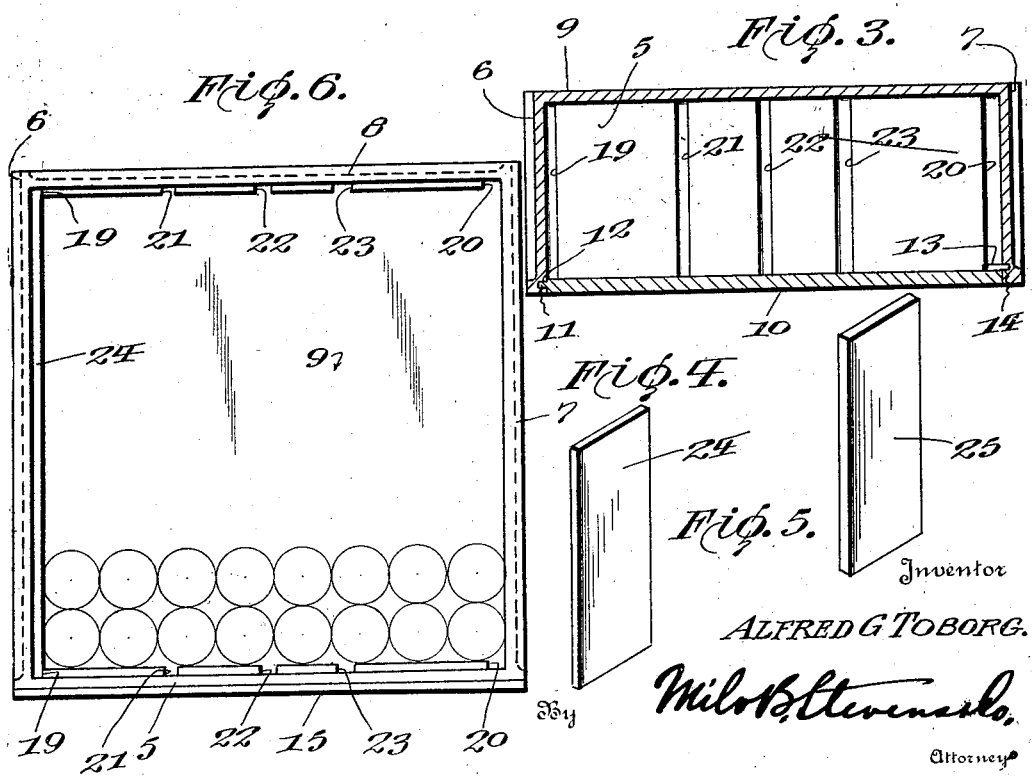

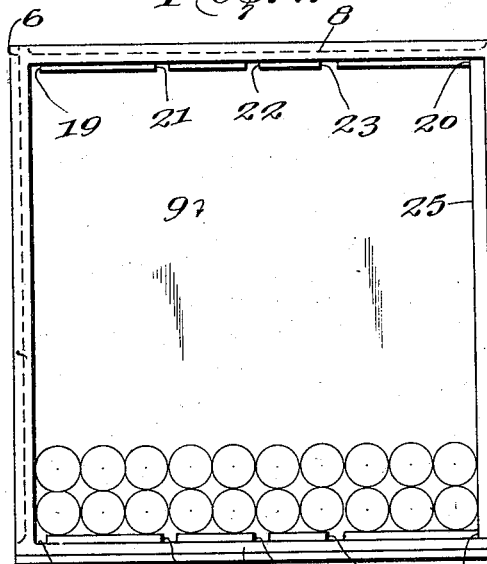
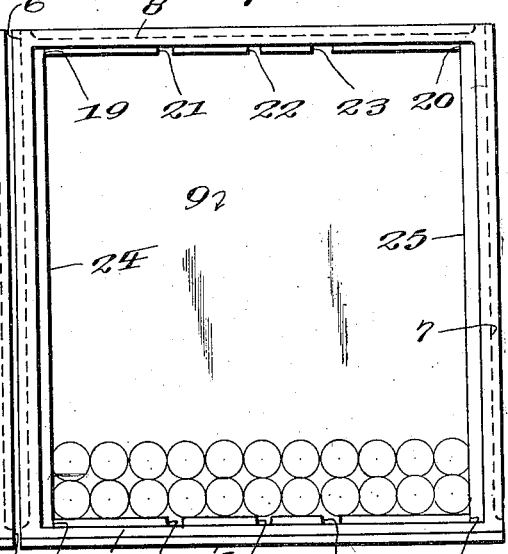
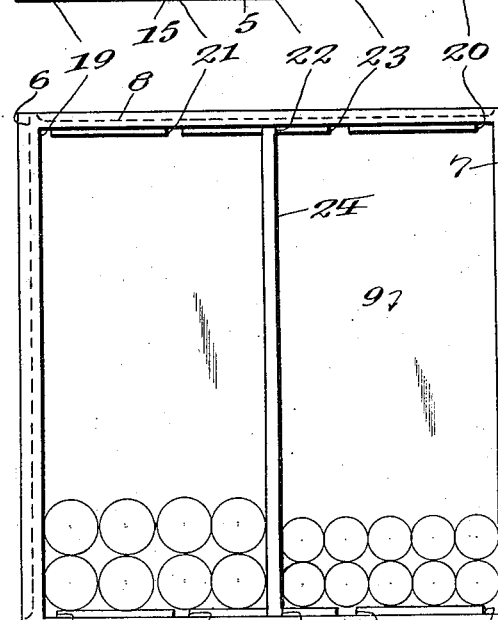
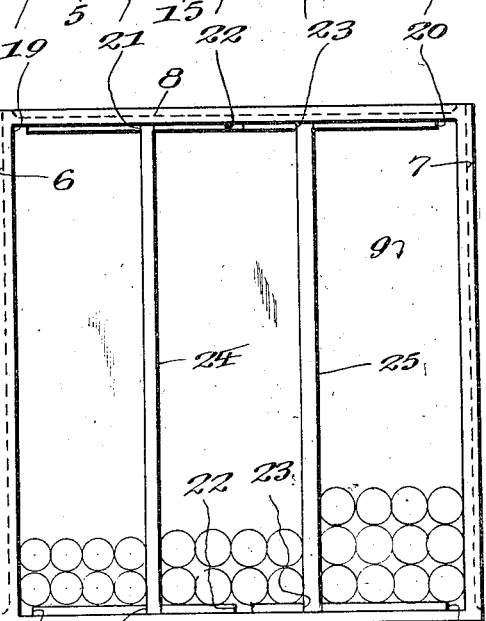

1,484,044

UNITED STATES PATENT OFFICE.

ALFRED G. TOBORG, OF CHICAGO, ILLINOIS.

COIN HOLDER.

Application filed February 23, 1922. Serial No. 538,667.

*To all whom it may concern:*

Be it known that I, ALFRED G. TOBORG, a citizen of the United States, residing at Chicago, in the county of Cook and State of Illinois, have invented new and useful Improvements in Coin Holders, of which the following is a specification.

The device which is the subject matter of the present application for patent has been designed to facilitate the storage, transportation and handling of coins, it being particularly adapted for use in banks and other establishments in which large quantities of coins are required to be handled.

The device consists of a receptacle embodying certain novel and improved features of construction which adapt the receptacle for coins of one and the same, or for coins of several different denominations.

In order that the invention may be better understood, reference is had to the accompanying drawing, wherein:

Fig. 1 is a perspective view of the receptacle; Fig. 2 is an enlarged cross-section thereof; Fig. 3 is a horizontal section on the line 3—3 of Fig. 2; Figs. 4 and 5 are perspective views of filler members or partitions, and Figs. 6 to 10 illustrate the various ways the coins may be stacked in the receptacle.

Referring specifically to the drawing, the device consists of a receptacle of rectangular shape, consisting of a bottom 5, sides 6 and 7, a top 8 and a rear 9, these parts being all rigidly united and forming an open-front receptacle. A removable cover 10 is provided for the open front of the receptacle. One of the vertical edges of the cover has outstanding lugs 11 seating in recesses 12 in the side wall 6, and at the other vertical edge of the cover is a lock 13 the bolt of which is adapted to enter a keeper recess 14 in the side wall 7. The cover is adapted to seat inside the top, bottom and side walls of the receptacle, flush with the front edges thereof. The under side of the bottom 5 is faced, as shown at 15, with wood, rubber or other material that will not scratch the counter or other surface on which the receptacle may be placed.

The receptacle is also provided with a handle 16 to facilitate transportation, said handle having its end portions 17 pivoted to the sides 6 and 7, as shown at 18, and said end portions being long enough to allow the handle to be swung behind the receptacle, thereby leaving the top thereof unobstructed so that another receptacle may be seated thereon.

On the inside of the receptacle, the top and bottom walls 8 and 5 thereof are formed with a number of grooves running parallel from the front to the rear. One of these grooves, denoted at 19, is next to the side wall 6, and another groove 20 is next to the side wall 7. The other grooves are intermediate the sides of the box and they are denoted at 21, 22 and 23. The grooves 19, 22 and 21 are designed to hold a partition strip 24, their width corresponding to the thickness of said strip. The grooves 23 and 20 are adapted to hold another partition strip 25, the width of said grooves corresponding to the thickness of this strip. It will be noted that the strip 25 is slightly thicker than the strip 24. When the strip 24 is placed in the end grooves 19 it reduces the width of the interior of the receptacle to the extent of the thickness of said strip, and the same is true when the strip 25 is placed in the end grooves 20. When the strip 24 is placed in the grooves 22, the interior of the receptacle is divided into two compartments, and it may also be divided into three compartments by placing the strip 24 in the grooves 21, and the strip 25 in the grooves 23. The purpose of the strips is to adapt the receptacle for coins of various denominations as will be explained in detail hereinafter.

The receptacle is designed to hold coins rolled in paper wrappers such as are commonly used, each roll containing a definite number of coins of one and the same denomination. The rolls of coins are laid in superposed rows, the depth of the receptacle conforming to the length of the rolls. As many rolls of one denomination as possible are placed snugly alongside of one another on the bottom of the receptacle to form a row, and if it is found that a space is left at the end of the row, the strip 24 is placed in the grooves 19 or the strip 25 is placed in the grooves 20, whereby the effective width of the receptacle interior is reduced to conform to the length of the row of coin rolls, the strips now acting as fillers. The clerk may now proceed to lay the next row, and then another row, and so on until the pile reaches the top of the receptacle and the receptacle is completely filled. As each row contains the same number of rolls, the number of coins in the receptacle can be very readily calculated.

When the receptacle is to be used for holding rolls of half-dollars, the filler strip 24 is placed in the grooves 19, as shown in Fig. 6. The width of the receptacle is now such that it will accommodate exactly eight rolls of coins in each row, or eighty dollars each row if each roll contains ten dollars.

To adapt the receptacle for quarters, the filler strip 25 is placed in the grooves 20 as shown in Fig. 7. The width of the receptacle is now such that it will accommodate exactly ten rolls in each row, or one hundred dollars each row if each roll contains ten dollars.

For dimes, no fillers at all are necessary, and the receptacle will hold exactly fourteen rolls in each row, or seventy dollars each row if each roll contains five dollars.

For nickels, place filler 24 in grooves 19 and filler 25 in grooves 20 as shown in Fig. 8. The receptacle will now hold eleven rolls in each row, or twenty-two dollars each row if each roll contains two dollars.

For pennies, no fillers are used, and the receptacle will hold thirteen rolls in each row, or six and one half dollars each row if each roll contains fifty cents.

When the receptacle is to hold coins of two different denominations, as, for instance, quarters and halves, place strip 24 in the groves 22, as shown in Fig. 9. The receptacle now is divided into two compartments one of which receives the quarters and the other the halves, the former holding five rolls per row, or fifty dollars each row if each roll contains ten dollars, and the latter holding four rolls per row, or forty dollars each row if each roll contains ten dollars.

To adapt the receptacle for coins of three different denominations, such as pennies, nickels and dimes, place strip 24 in the grooves 21, and strip 25 in the grooves 23, as shown in Fig. 10. The receptacle is now divided into three compartments. The pennies compartment will hold four rolls per row, or two dollars in each row, if each roll contains fifty cents. The nickels compartment will hold four rolls per row, or eighty dollars each row if each roll contains two dollars. The dimes compartment will hold four rolls per row, or twenty dollars in each row, if each roll contains five dollars.

The outside of the cover 10 may be provided with a number or other indicia. At the close of business, the cover 10 will be applied to prevent the rolls of coins from dropping out when carrying the receptacle to the vault, and as the cover can be locked no one has access to the receptacle except the holder of the key.

Referring to Fig. 1, it will be noted that the handle pivot 18 is not centrally located with respect to the receptacle, but is set slightly forward, so that the receptacle is unbalanced when it is held suspended by the handle, and hence has a rearward tilt, the preponderance of the weight being at the rear. This prevents the contents of the receptacle from falling out if the person carrying the same should forget to lock the cover 10.

I claim:

1. A coin-holder comprising a rectangular receptacle which is open in front and has on the inside top and bottom grooves running from the front to the rear, certain ones of said grooves being intermediate the sides of the receptacle and others being adjacent to said sides, and strips adapted to be mounted in the first-mentioned grooves to form partitions dividing the interior of the receptacle into compartments, said strips being removable for insertion into the second-mentioned grooves to form fillers reducing the effective width of the receptacle interior.

2. A coin-holder comprising a rectangular receptacle which is open in front and has on the inside top and bottom grooves running from the front to the rear, certain ones of said grooves being intermediate the sides of the receptacle and others being adjacent to said sides, and strips adapted to be mounted in the first-mentioned grooves to form partitions dividing the interior of the receptacle into compartments, said strips being removable for insertion into the second-mentioned grooves to form fillers reducing the effective width of the receptacle interior, said strips varying in thickness, and the width of the grooves adapted to receive the strips being correspondingly varied.

3. A coin-holder comprising a rectangular receptacle which is open in front and has on the inside top and bottom grooves running from the front to the rear, certain ones of said grooves being intermediate the sides of the receptacle and others being adjacent to said sides, strips adapted to be mounted in the first-mentioned grooves to form partitions dividing the interior of the receptacle into compartments, said strips being removable for insertion into the second-mentioned grooves to form fillers reducing the effective width of the receptacle interior, and a removable closure for the open front of the receptacle.

4. A coin-holder comprising a receptacle which is open in front, a closure for said open front, and a handle pivotally connected to the receptacle at points resulting in the same being unbalanced to have a rearward tilt when held suspended from the handle.

5. A coin-holder comprising a receptacle which is open in front, a closure for said open front having engaging lugs and a handle pivotally connected to the receptacle at points forwardly of its longitudinal axis resulting in the same being unbalanced to have a rearward tilt when held suspended from the handle, said handle being adapted to be swung to position at the rear of said receptacle to provide for the seating of a similar receptacle thereon when arranging the receptacles in stacks.

In testimony whereof I affix my signature.

ALFRED G. TOBORG.